UNITED STATES PATENT OFFICE.

ALBERT EDWARD HUMPHRIES, OF WEYBRIDGE, ENGLAND.

MILLING FLOUR.

983,719.     Specification of Letters Patent.     Patented Feb. 7, 1911.

No Drawing.     Application filed June 8, 1909.  Serial No. 500,918.

*To all whom it may concern:*

Be it known that I, ALBERT EDWARD HUMPHRIES, a subject of the King of Great Britain, residing at Coxes Lock Mills, Weybridge, in the county of Surrey, England, miller, have invented certain new and useful Improvements in or Relating to the Milling of Flour, of which the following is a full, clear, and exact description.

The addition of various substances to flour for the purpose of modifying its properties is well known. Originally it was left to the baker to mix such substances with his dough. It was then proposed to supply the baker with flour already intermixed with the desired substance; there is considerable difficulty, however, in attaining this object. Above all things, it is essential that the mixture shall be very intimate, an end achieved by the baker in mixing the substance dissolved in water with his dough. Heretofore however, no mode has become known for mixing the substance in solution with the flour before it is delivered to the baker. Hence the dry substance has been mixed with the flour, with the result that a very imperfect mixture, as compared with that produced in the dough, has been made. Moreover, it has been impossible to mix with the flour a liquid or semiliquid substance before the flour is delivered to the baker. In order to improve the intermixture, the dry substance has been added during the process of manufacture, so that the grinding may aid the intermixing, but even in this case, the intermixture is very imperfect as compared with that produced in the dough, especially when the percentage of added matter is to be extremely small.

It has hitherto been common experience that when water is added to flour in quantity insufficient to convert the latter into dough, the water is not uniformly distributed throughout the flour; doughy lumps are formed within which the water is confined, and these lumps not only prevent the uniform dissemination throughout the flour of any substance contained in the water, but necessitates the drying and regrinding of the flour, or the sifting out of the lumps therefrom. Even a small proportion of such lumps is sufficient to create difficulties in milling, particularly in the bolting machines where the pasty material tends to close up the meshes of the bolting silks. It is for this reason that the known improvement in the baking properties of flour produced by increasing its content of water has hitherto been effected by subjecting the flour to the action of air laden with water vapor.

I have made the discovery that, if either a flour-yielding product of the flour mill taken at any stage between the first break and the packing operation, or if the finished flour, is subjected to a very finely subdivided spray of water, the formation of lumps does not occur and the water with any substance contained in it, either dissolved or in suspension, is most uniformly intermixed with the flour, this intermixture being even better when the spray is applied to the stock (which term denotes partly milled grain in any of the intermediate stages of the flour milling process subsequent to the first break) than when it is applied to the flour.

The invention consists primarily therefore in applying the modifying ingredient or material which is to be introduced into the stock or flour in the form of a very finely divided spray. The material must be dissolved or suspended in water in order that it may be applied according to the invention. The effect of this mode of application is to distribute the added matter throughout the flour in an exceedingly fine state of division and to bring it into very intimate contact with the particles of flour.

By using a solution or suspension of appropriate concentration, it is possible to obtain a very good admixture of very minute proportions of material which might act detrimentally if added otherwise than in such proportions.

Suitable agitation of the stock or flour during the spraying operation, such as in any well known form of reel, is essential to the process.

As a specific example of the process, when a phosphate is applied, 250 pounds of crystallized potassium dihydrogen phosphate (acid phosphate of potash) may be dissolved in 100 gallons of water, and this solution may be sprayed into the flour at the rate of one and one-half pounds of the solution, per 100 pounds of flour passing through the reel.

Changes may be made in the flour making method and in the modifying ingredient, without departing from my invention.

I claim:

1. In the process of producing flour having modified properties, the steps which consist in agitating a finely sub-divided flour-yielding product of the flour mill taken at any stage between the first break and the packing operation, and subjecting the material in agitation to a very finely subdivided spray of water containing a modifying ingredient in suspension or solution.

2. A process of producing flour having modified properties, which process consists in agitating the flour and subjecting the flour in agitation to a very finely subdivided spray of water containing a modifying ingredient in solution or suspension.

In testimony whereof I have signed my name to this specification in the presence of two subscribing witnesses.

ALBERT EDWARD HUMPHRIES.

Witnesses:
  JOSEPH MILLARD,
  W. J. SKERTEN.